(12) United States Patent
Oh et al.

(10) Patent No.: US 10,273,599 B2
(45) Date of Patent: Apr. 30, 2019

(54) APPARATUS FOR MANUFACTURING CARBON NANOTUBE FIBER

(71) Applicant: LG CHEM, LTD., Seoul (KR)

(72) Inventors: Eu-gene Oh, Daejeon (KR); Young-Ho Lee, Daejeon (KR); Ji-Eun Kim, Daejeon (KR); Ju-Han Kim, Daejeon (KR); Yong-Jin Choe, Daejeon (KR)

(73) Assignee: LG CHEM, LTD., Seoul (KR)

( * ) Notice: Subject to any disclaimer, the term of this patent is extended or adjusted under 35 U.S.C. 154(b) by 217 days.

(21) Appl. No.: 15/526,148

(22) PCT Filed: Jul. 25, 2016

(86) PCT No.: PCT/KR2016/008113
§ 371 (c)(1),
(2) Date: May 11, 2017

(87) PCT Pub. No.: WO2017/018766
PCT Pub. Date: Feb. 2, 2017

(65) Prior Publication Data
US 2017/0306529 A1    Oct. 26, 2017

(30) Foreign Application Priority Data

Jul. 24, 2015   (KR) .................. 10-2015-0105176
Jul. 24, 2015   (KR) .................. 10-2015-0105189

(51) Int. Cl.
| | |
|---|---|
| *D01D 5/00* | (2006.01) |
| *D01D 5/28* | (2006.01) |
| *B82B 1/00* | (2006.01) |
| *D01F 9/12* | (2006.01) |
| *D01F 9/127* | (2006.01) |

(Continued)

(52) U.S. Cl.
CPC ............ *D01D 5/28* (2013.01); *B82B 1/00* (2013.01); *C01B 32/164* (2017.08); *C01B 32/17* (2017.08); *D01D 5/00* (2013.01); *D01D 7/00* (2013.01); *D01F 9/12* (2013.01); *D01F 9/127* (2013.01); *D01F 9/1277* (2013.01); *D01F 9/133* (2013.01); *D01F 11/16* (2013.01); *B82B 3/0004* (2013.01); *B82Y 30/00* (2013.01); *B82Y 40/00* (2013.01); *Y10S 977/742* (2013.01); *Y10S 977/843* (2013.01); *Y10S 977/961* (2013.01)

(58) Field of Classification Search
USPC .................. 425/174.6, 174.8 R, 174.8 E
See application file for complete search history.

(56) References Cited

U.S. PATENT DOCUMENTS 5,135,724 A  *  8/1992  Dinter ............... B29C 59/12
                                                     422/186.05
6,214,201 B1    4/2001  Park et al.
(Continued)

FOREIGN PATENT DOCUMENTS

CN      1549280 A     11/2004
CN      1903710 A     1/2007
(Continued)

OTHER PUBLICATIONS

KIPO machine translation of KR 2012-0090383, retrieved Feb. 7, 2019 (Year: 2012).*

*Primary Examiner* — Timothy Kennedy
(74) *Attorney, Agent, or Firm* — Dentons US LLP (57) ABSTRACT

Disclosed is an apparatus for manufacturing a carbon nanotube fiber.

20 Claims, 5 Drawing Sheets

(51) Int. Cl.
*D01F 9/133* (2006.01)
*C01B 32/17* (2017.01)
*C01B 32/164* (2017.01)
*D01D 7/00* (2006.01)
*D01F 11/16* (2006.01)
*B82Y 40/00* (2011.01)
*B82B 3/00* (2006.01)
*B82Y 30/00* (2011.01)

(56) References Cited

U.S. PATENT DOCUMENTS

| | | | |
|---|---|---|---|
| 6,683,783 B1 | 1/2004 | Smalley et al. | |
| 8,658,281 B2 | 2/2014 | Kim | |
| 2003/0236588 A1* | 12/2003 | Jang | B82Y 30/00 700/119 |
| 2004/0166311 A1* | 8/2004 | Yang | D01D 1/02 428/365 |
| 2005/0006801 A1* | 1/2005 | Kinloch | B82Y 30/00 264/5 |
| 2005/0087288 A1* | 4/2005 | Haynes | D01D 5/0985 156/167 |
| 2005/0189671 A1* | 9/2005 | Greywall | B82Y 30/00 264/103 |
| 2006/0021304 A1* | 2/2006 | Merino Sanchez | D01F 9/133 55/338 |
| 2007/0163217 A1* | 7/2007 | Frey | B01D 39/1623 55/482 |
| 2009/0127747 A1* | 5/2009 | Green | D01D 5/0038 264/413 |
| 2009/0186223 A1* | 7/2009 | Saito | D01F 9/127 428/367 |
| 2009/0261498 A1* | 10/2009 | Rheinnecker | B29C 47/32 264/176.1 |
| 2009/0324950 A1* | 12/2009 | Kim | D01D 5/0076 428/400 |
| 2010/0074834 A1 | 3/2010 | Kim et al. | |
| 2010/0084793 A1* | 4/2010 | Huang | D01D 5/0069 264/465 |
| 2010/0196250 A1* | 8/2010 | Derre | D01D 5/06 423/447.2 |
| 2011/0171454 A1* | 7/2011 | Hitoe | B82Y 30/00 428/292.1 |
| 2012/0114722 A1* | 5/2012 | Ballard | D01D 5/0007 424/409 |
| 2013/0009337 A1* | 1/2013 | Koenders | D01D 5/06 264/183 |
| 2015/0240391 A1 | 8/2015 | Oh et al. | |

FOREIGN PATENT DOCUMENTS

| | | |
|---|---|---|
| CN | 101153413 A | 4/2008 |
| CN | 104641028 A | 5/2015 |
| JP | 08198611 A | 8/1996 |
| JP | 2000-064172 A | 2/2000 |
| JP | 2006-335624 A | 12/2006 |
| JP | 2007-536434 A | 12/2007 |
| JP | 2008100901 A | 5/2008 |
| JP | 2010-065339 A | 3/2010 |
| JP | 6509559 B2 | 6/2014 |
| JP | 2015-533760 A | 11/2015 |
| JP | 2016-017005 A | 2/2016 |
| KR | 10-0269723 B1 | 10/2000 |
| KR | 1020080021334 A | 3/2008 |
| KR | 10-0841939 B1 | 6/2008 |
| KR | 10-2010-0033858 A | 3/2010 |
| KR | 10-2012-0090383 A | 8/2012 |
| KR | 10-1286751 B | 7/2013 |
| KR | 10-2014-0147004 A | 12/2014 |
| WO | 2012/108607 A1 | 8/2012 |

\* cited by examiner

APPARATUS FOR MANUFACTURING CARBON NANOTUBE FIBER

TECHNICAL FIELD

This application is a National Stage Entry of International Application No. PCT/KR2016/008113, filed on Jul. 25, 2016, and claims the benefit of Korean Application No. 10-2015-0105189, filed on Jul. 24, 2015, and Korean Application No. 10-2015-0105176 filed on Jul. 24, 2015, all of which are hereby incorporated by reference in their entirety for all purposes as if fully set forth herein.

The present invention relates to an apparatus for manufacturing a carbon nanotube fiber.

BACKGROUND ART

A carbon nanotube (CNT), which is a kind of carbon allotrope, is a material having a diameter of ones to tens of nm and a length ranging from hundreds of μm to ones of mm, and has been studied for use in various fields due to its excellent thermal, electrical, and physical properties and high aspect ratio since it was reported in the journal Nature in 1991 by Dr. Iijima. Such carbon nanotubes have inherent properties caused by the sp2 bond of carbon, are stronger than iron and are lighter than aluminum, and exhibit electrical conductivity similar to metal. Carbon nanotubes are largely classified into, depending on the number of walls of nanotubes, single-wall carbon nanotubes (SWNTs), double-wall carbon nanotubes (DWNTs), and multi-wall carbon nanotubes (MWNTs), and have zigzag, armchair, and chiral conformations depending on their asymmetry and chirality.

A carbon nanotube (CNT) fiber is manufactured through forest spinning or direct spinning. The forest-spinning process is performed in a manner in which a catalyst is deposited on a substrate, a CNT forest is synthesized in a direction perpendicular to the substrate, and CNTs at the ends of the substrate are pulled with tweezers or tape, whereby the CNTs are connected due to van der Waals force between CNTs, thus spinning a CNT fiber. This method is disadvantageous because a continuous process cannot be implemented, making it impossible to increase the productivity thereof.

Meanwhile, a carbon nanotube (CNT) fiber includes various kinds of impurities. In particular, the impurities that are the most abundantly present are amorphous carbon, which is decomposed in a gas phase and formed inside and outside the fiber. Such impurities degrade the quality of the fiber and must be removed.

Typically, amorphous carbon may be removed through oxidation at a temperature of 400 to 500° C. The removal of amorphous carbon is currently performed by passing a fiber through a heat source such as a furnace. However, this method negates economic benefits because an expensive furnace has to be used. Moreover, since the furnace has a limit as to its length, a plurality of furnaces has to be provided to increase the retention time of the fiber, thus negating economic benefits. Alternatively, the rate of movement of a fiber passing through a reactor may be decreased, which may also undesirably reduce productivity. Hence, a novel method of removing impurities is required.

DISCLOSURE

Technical Problem

A conventional apparatus for removing impurities from a carbon nanotube (CNT) fiber negates economic benefits and deteriorates productivity.

Accordingly, the present invention is intended to provide an apparatus for manufacturing a carbon nanotube fiber that makes it easy to remove impurities and has a simple configuration, thus generating economic benefits.

Technical Solution

Therefore, the present invention provides an apparatus for manufacturing a carbon nanotube fiber, comprising: a cylindrical high-temperature reactor body having a reaction zone; an inlet for feeding a spinning material and a carrier gas into the reaction zone of the body; a heater for heating the reaction zone; an outlet provided at the bottom of the body so as to discharge a carbon nanotube fiber; a winder for collecting the discharged carbon nanotube fiber; a guide provided between the outlet and the winder; and a voltage supplier for applying voltage to the guide, wherein voltage is applied to the discharged carbon nanotube fiber to remove impurities from the carbon nanotube fiber.

In a preferred embodiment of the present invention, the inlet may include a spray nozzle for injecting a spinning material and a distribution plate for injecting a carrier gas. Also, the spinning material may be configured such that a catalyst precursor is dispersed in a liquid or gas carbon compound, and the spinning material may further include a catalyst activator. In a preferred embodiment of the present invention, the carrier gas may be a hydrocarbon gas, an inert gas, a reducing gas or a mixed gas thereof.

Advantageous Effects

According to the present invention, an apparatus for manufacturing a carbon nanotube fiber enables amorphous carbon to be readily removed through Joule heating of the carbon nanotube fiber. Furthermore, the apparatus for manufacturing a carbon nanotube fiber according to the present invention has a simple configuration and is thus economically favorable.

According to the present invention, the apparatus for manufacturing a carbon nanotube fiber is capable of obtaining a carbon nanotube fiber having high strength and elasticity without impurities. Thus, the carbon nanotube fiber of the invention can be expected to be useful in reinforcements of multi-functional composites, deformation and damage sensors, which take advantage of a stable and repeatable piezoresistive effect, highly conductive transmission lines, and electrochemical devices required to have a high specific surface area and superior mechanical properties and electrical conductivity, for example, micro electrode materials for detecting biomaterials, supercapacitors and actuators.

BEST MODE

Hereinafter, a detailed description will be given of the present invention. The following description is merely set forth to illustrate embodiments of the present invention, but is not to be construed as limiting the scope defined by the claims, even if it contains restrictive expressions.

Throughout the drawings, the same reference numerals will refer to the same or like parts.

As used herein, the term "and/or" includes any one or combinations of the associated listed items.

It is also noted that in this specification, "connected" or "coupled" refers to one component that may not only be directly coupled to another component but may also be indirectly coupled to another component through an intermediate component.

As used herein, the singular forms are intended to include the plural forms as well, unless the context clearly indicates otherwise.

It will be further understood that the terms "comprise", "include", "have", etc. when used in this specification, specify the presence of stated features, numbers, steps, operations, components, parts or combinations thereof, but do not preclude the presence or addition of one or more other features, numbers, steps, operations, components, parts or combinations thereof.

As used herein, the term "carbon nanotube fiber" refers to all cases where a carbon nanotube is grown in the form of a fiber or in which a plurality of carbon nanotubes is fused in the form of a fiber.

Examples of the production of carbon nanotube fiber may include solution spinning, array spinning, aerogel spinning and/or film twisting or rolling. In the present invention, chemical vapor deposition (CVD) is used so that a carbon nanotube fiber or ribbon is directly spun from carbon nanotube aerogel formed immediately after a spinning material is fed into a reactor.

The direct spinning process is performed in a manner in which a carbon source is added with a catalyst and fed into a vertical high-temperature heating furnace together with a carrier gas at a predetermined rate to thus synthesize carbon nanotubes in the heating furnace, and a carbon nanotube fiber composed exclusively of carbon nanotubes is continuously manufactured.

In the present invention, a catalyst precursor is a material that is not included in a catalyst cycle in the system of a catalytic reaction but changes into an active catalyst (or produces an active catalyst), and in the present invention, a catalyst is formed from the catalyst precursor, followed by the synthesis of CNT.

Figure 1:
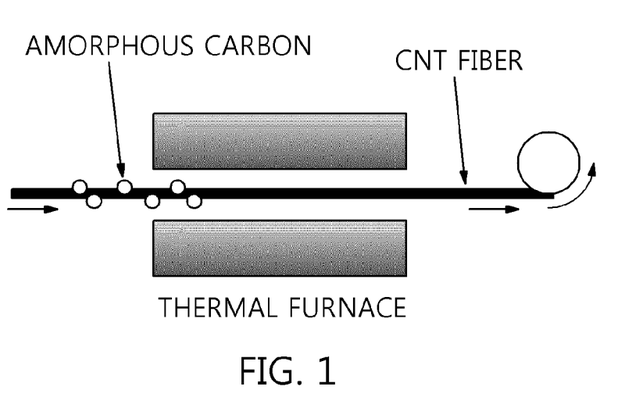
FIG. 1 schematically shows a conventional winder including an impurity remover.

FIG. 1 shows the conventional winder having an impurity remover, and a conventional apparatus for manufacturing a carbon nanotube (CNT) fiber functions to remove impurities by passing a fiber through a heat source such as a furnace. However, this method requires the use of an expensive furnace and negates economic benefits.

The present inventors have performed extensive research and devised an apparatus for manufacturing a carbon nanotube fiber using Joule heating, thereby solving the conventional problems.

Specifically, the apparatus for manufacturing a carbon nanotube fiber includes: a cylindrical high-temperature reactor body having a reaction zone; an inlet for feeding a spinning material and a carrier gas into the reaction zone of the body; a heater for heating the reaction zone; an outlet provided at the bottom of the body so as to discharge a carbon nanotube fiber; a winder for collecting the discharged carbon nanotube fiber; a guide provided between the outlet and the winder; and a voltage supplier for applying voltage to the guide, wherein voltage is applied to the discharged carbon nanotube fiber to remove impurities from the carbon nanotube fiber. The impurities may be amorphous carbon.

Below is a description of the present invention with reference to the accompanying drawings.

Figure 2:
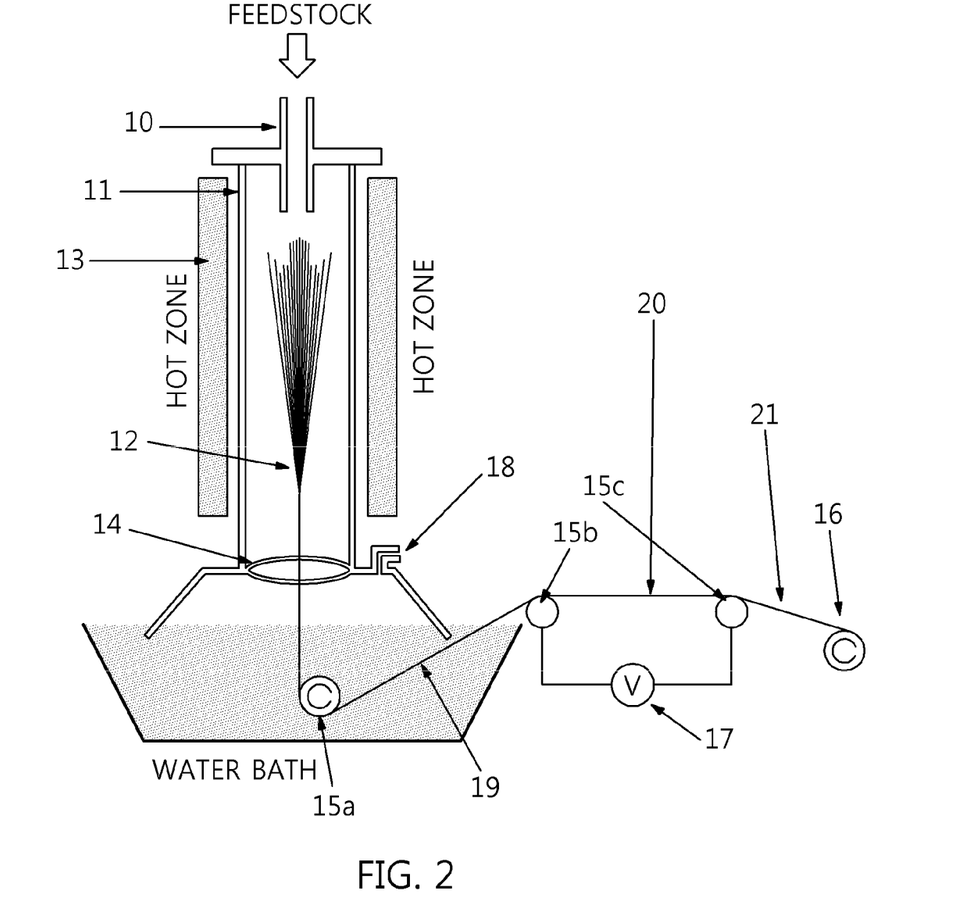
FIG. 2 shows an apparatus for manufacturing a carbon nanotube fiber according to an embodiment of the present invention.

FIG. 2 shows the apparatus for manufacturing a carbon nanotube fiber according to an embodiment of the present invention, comprising: a cylindrical high-temperature reactor body 11 having a reaction zone; an inlet 10 for feeding a spinning material and a carrier gas into the reaction zone of the body; a heater 13 for heating the reaction zone; an outlet 14 provided at the bottom of the body so as to discharge a carbon nanotube fiber; a winder 16 connected to the outlet; guides 15a, 15b, 15c provided between the outlet and the winder; and a voltage supplier 17 for applying voltage to some of the guides.

In the apparatus for manufacturing a carbon nanotube fiber according to the present invention, the inlet 10 may further include a spinning material supply unit for supplying the spinning material into the reactor body 11 and a carrier gas supply unit for supplying the carrier gas. Also, the spinning material supply unit may include a mixing part for dispersing a catalyst precursor in a gas or liquid carbon compound and a transport pump for supplying the spinning material formed in the mixing part into a spinning material spray nozzle. The carrier gas may be fed into the reactor body 11 via the inlet 10 from the carrier gas supply unit, which includes a gas tank and a flow rate regulator. The inlet 10 may include a spray nozzle for injecting the spinning material and a distribution plate for injecting the carrier gas. The inlet may be a spray nozzle, but the present invention is not limited thereto.

In the present invention, the heater may be a heating furnace surrounding the reactor body, and may function to heat the reaction zone 12 to 1,000 to 3,000° C. The reactor may endure a high temperature range of preferably 1,000 to 2,000° C., 1,000 to 1,500° C. or 1,000 to 1300° C., and more preferably 1,100 to 1,200° C. The temperature of the high temperature range of the reactor may affect the rate of diffusion of carbon in a catalyst to thereby control the growth rate of carbon nanotubes. When the carbon nanotubes are synthesized using CVD, the growth rate of carbon nanotubes is typically increased with an increase in the synthesis temperature, thus elevating crystallinity and strength.

According to a preferred embodiment of the present invention, the outlet 14 may be connected to the winder 16 for winding and collecting the carbon nanotube fiber including impurities discharged from the bottom of the cylindrical high-temperature reactor body. In a preferred embodiment of the present invention, the winder 16 may include at least one selected from the group consisting of a spindle, a reel, a bobbin, a drum and a conveyor, and is preferably a bobbin. However, the present invention is not limited thereto, and any member able to stably wind the discharged carbon nanotube fiber may be used. The winding rate has an influence on the orientation of the carbon nanotubes in the fiber in a fiber axis direction, thus determining the thermal, electrical and/or physical properties of the carbon nanotube fiber. Preferably, winding is performed at a rate ranging from 5 to 100 rpm.

Here, at least one winder, and preferably a single winder, is provided. The guide may be provided between the outlet and the winder. In a preferred embodiment of the present invention, the guide may include at least one selected from the group consisting of a copper electrode, a tungsten electrode, a stainless steel electrode, a gold electrode and a silver electrode, and is preferably a copper electrode. Here, two or more guides, preferably two guides, and more preferably three guides are provided. In a preferred embodiment of the present invention, a gas separator may be further provided between the outlet and the winder. The gas separator functions to separate the remaining gas from the carbon nanotube fiber. The gas separator may include at least one selected from the group consisting of a water bath and a glove box. In a preferred embodiment of the present invention, at least two of the above guides may be connected to the voltage supplier. Alternatively, when three or more guides are provided, at least one of the guides may be included in the gas separator.

For example, as shown in FIG. 2, a guide 15a is provided in a water bath, and two guides 15b, 15c and a winder 16 are sequentially provided outside of the water bath. Specifically, the carbon nanotube fiber, discharged via the outlet, is passed through the guide in the water bath and is then transported to the guides outside of the water bath. As such, while passing a carbon nanotube fiber, which is a continuous aggregate of carbon nanotubes having a cylindrical shape, through the water bath, it shrinks, and may thus be provided in the form of a thin shape such as a thread. The carbon nanotube fiber 19 including impurities, having passed through the water bath, is transported to the guides 15b, 15c connected to the voltage supplier so that voltage is applied thereto. That is, in the present invention, while the carbon nanotube fiber 19 including impurities, discharged via the outlet, moves in a slippery manner from the guides, it is converted into a Joule-heated carbon nanotube fiber 20. The impurities include amorphous carbon, and the carbon nanotube fiber including impurities is subjected to Joule heating, and thus the amorphous carbon is removed. Accordingly, a carbon nanotube fiber 21 having no impurities is finally wound. Meanwhile, the amorphous carbon is oxidized at a temperature of 300 to 600° C. and may thus be removed. Hence, the voltage may range from 1 to 20 V, and preferably from 9 to 11 V. If the voltage is less than 1 V, the amorphous carbon may not be removed from the surface of the carbon nanotube fiber. On the other hand, if the voltage exceeds 20 V, crystalline carbon, namely carbon nanotubes, may be oxidized and removed.

Specifically, the reaction in the apparatus for manufacturing a carbon nanotube fiber according to the present invention is described. The spinning material and the carrier gas are fed into the reactor via the inlet. When the catalyst precursor contained in the spinning material is placed in the reactor, a catalyst is formed. While the catalyst thus formed is allowed to flow from the top of the reactor to the bottom thereof, carbon nanotubes are synthesized in the reaction zone 12. The synthesized carbon nanotubes are grown or fused and continuously aggregated, thus forming a cylindrical carbon nanotube fiber. Here, catalyst particles on which CNTs are grown are moved to the bottom of the reactor, and the formed CNT fiber is discharged via the outlet 14 from the bottom of the reactor body and the heating furnace. Then, the carbon nanotube fiber is collected by the winder 16 and taken out of the hot zone and wound. It moves in a slippery manner to the guides provided to the winder. Simultaneously, voltage is applied to the guides using a voltage supplier, thereby removing impurities from the carbon nanotube fiber. Also, unreacted gas including the carrier gas and/or unreacted spinning material is discharged via an exhaust port 18. The catalyst is discharged together with CNTs because CNTs are grown, and a small amount of unreacted catalyst is discharged in the state of being attached to CNTs. The exhaust port for exhausting the unreacted gas remaining in the reaction zone may be provided between the heater and the outlet or downstream of the CNT fiber outlet. The unreacted gas may include the unreacted spinning material and carrier gas.

Meanwhile, the spinning material may include a carbon compound not only in a liquid phase but also in a gas phase. The liquid or gas carbon compound, serving as a carbon source, may diffuse in the catalyst, thus synthesizing carbon nanotubes, and is used taking into consideration the molecular weight distribution, concentration, viscosity, surface tension, dielectric constant, and properties of the solvent that is used.

According to a preferred embodiment of the present invention, the liquid or gas carbon compound may include at least one selected from the group consisting of methane, ethylene, acetylene, methyl acetylene, vinyl acetylene, ethanol, methanol, propanol, acetone, xylene, chloroform, ethyl acetate, diethyl ether, polyethylene glycol, ethyl formate, mesitylene, tetrahydrofuran (THF), dimethylformamide (DMF), dichloromethane, hexane, benzene, carbon tetrachloride and pentane. Specifically, the liquid carbon compound may include at least one selected from the group consisting of ethanol, methanol, propanol, acetone, xylene, chloroform, ethyl acetate, diethyl ether, polyethylene glycol, ethyl formate, mesitylene, tetrahydrofuran (THF), dimethylformamide (DMF), dichloromethane, hexane, benzene, carbon tetrachloride and pentane. Preferably, the liquid carbon compound includes at least one selected from the group consisting of ethanol ($C_2H_5OH$), xylene ($C_8H_{10}$), diethyl ether [$(C_2H_5)_2O$], polyethylene glycol [—$CH_2$—$CH_2O)_9$], 1-propanol ($CH_3CH_2CH_2OH$), acetone ($CH_3OCH_3$), ethyl formate ($CH_3CH_2COOH$), benzene ($C_6H_6$), hexane ($C_6H_{14}$) and mesitylene [$C_6H_3(CH_3)_3$]. The gas carbon compound may include at least one selected from the group consisting of methane, ethylene, acetylene, methyl acetylene and vinyl acetylene.

In a preferred embodiment of the present invention, the spinning material is configured such that a catalyst precursor is dispersed in the liquid or gas carbon compound. The spinning material may include the catalyst precursor in an amount of 0.5 to 5 wt %, preferably 1 to 5 wt %, or 1.5 to 4 wt % based on the amount of the liquid or gas carbon compound. If an excess of the catalyst precursor is used relative to the amount of the liquid or gas carbon compound of the spinning material, the catalyst may act as an impurity, making it difficult to obtain a highly pure carbon nanotube fiber. Furthermore, the thermal, electrical and/or physical properties of the carbon nanotube fiber may be may deteriorated. In the present invention, the catalyst precursor may include, but is not limited to, at least one selected from the group consisting of metallocene including ferrocene, iron, nickel, cobalt, platinum, ruthenium, molybdenum, vanadium and oxides thereof. Also, the catalyst precursor may be provided in the form of nanoparticles. Preferably useful is a catalyst precursor including at least one selected from the group consisting of a compound containing iron, nickel, cobalt, etc., for example, metallocene such as ferrocene; iron such as iron chloride ($FeCl_2$); cobalt; and nickel atoms.

In a preferred embodiment of the present invention, the spinning material may further include a catalyst activator. Typically, the synthesis of carbon nanotubes progresses in a manner in which carbon is diffused in the catalyst that is melted and is then deposited, and the catalyst activator is used as a promoter upon the synthesis of carbon nanotubes to thus increase a carbon diffusion rate, whereby carbon nanotubes are synthesized within a short time. The catalyst activator may be exemplified by thiophene ($C_4H_4S$). Thiophene functions to decrease the melting point of the catalyst and to remove amorphous carbon, thus synthesizing highly pure carbon nanotubes at a low temperature. The amount of the catalyst activator may affect the structure of the carbon nanotubes. For example, when 1 to 5 wt % of thiophene is added to ethanol as the carbon compound, a multi-wall carbon nanotube fiber may be obtained, and when 0.5 wt % or less of thiophene is added to ethanol, a single-wall carbon nanotube fiber may be obtained. In a preferred embodiment of the present invention, the catalyst precursor and the catalyst activator may be liquids in the liquid carbon compound, or may be gases in the gas carbon compound. Thus, the catalyst precursor or the catalyst activator may be dissolved and then fed into the liquid carbon compound, and may be vaporized and then fed in the form of gas into the gas carbon compound.

In a preferred embodiment of the present invention, the carrier gas may be a hydrocarbon gas, an inert gas, a reducing gas, or a mixed gas thereof. The inert gas may be argon, nitrogen or a mixed gas thereof, and the reducing gas may be hydrogen, ammonia or a mixed gas thereof.

In addition, the present invention addresses a method of manufacturing a carbon nanotube fiber using the apparatus for manufacturing a carbon nanotube fiber of the present invention. Specifically, the method comprises the steps of (a) forming a carbon nanotube fiber, which is a continuous aggregate of carbon nanotubes, by reacting a spinning material with a carrier gas; and (b) winding the carbon nanotube fiber, wherein voltage is applied to the carbon nanotube fiber between steps (a) and (b), after step (b), or during step (b), thereby removing impurities from the carbon nanotube fiber. Preferably, the carbon nanotube fiber formed in step (a) is passed through a water bath, after which voltage may be applied thereto. The fiber may then be wound in step (b). The carbon nanotube fiber may shrink while passing through the water bath, and may thus be provided in a thin form such as a thread. This construction may be as described above.

MODE FOR INVENTION

A better understanding of the present invention may be obtained via the following examples, which are merely set forth to illustrate the present invention, and such examples may be appropriately modified and altered within the scope and spirit of the invention, as will be apparent to those skilled in the art, and such modifications and alterations should also be understood as falling within the scope defined by the accompanying claims.

Example 1

A spinning solution was prepared by mixing 97.6 wt % of acetone, which is a liquid carbon compound, with 1.6 wt % of ferrocene, which is a catalyst precursor, and 0.8 wt % of thiophene. Hydrogen was provided as a carrier gas. The spinning solution was fed at a rate of 10 mL/hr and the carrier gas was fed at a rate of 2 L/min into the top of a cylindrical reactor at 1173° C. The carbon nanotube fiber discharged via the outlet at the bottom of the reactor was wound using a winder composed of two bobbins. Two copper electrodes were provided between the two bobbins, and a voltage supplier was connected to the copper electrodes. 10 V was applied to both ends of the carbon nanotube fiber using the voltage supplier, and Joule heating of 480° C. was thus performed.

Comparative Example 1

This Comparative Example was performed in the same manner as in Example 1, with the exception that voltage was not applied.

Comparative Example 2

This Comparative Example was performed in the same manner as in Example 1, with the exception that voltage of 16 V was applied.

Test Example 1

The CNT fiber of each of Example 1 and Comparative Examples 1 and 2 was measured for SEM-EDS. The results are shown in Table 1 below and FIGS. 3 to 5.

TABLE 1

| Element | Example 1 | | Comp. Example 1 | | Comp. Example 2 | |
| --- | --- | --- | --- | --- | --- | --- |
| | Weight | Atomic | Weight | Atomic | Weight | Atomic |
| C | 64.00 | 81.53 | 69.45 | 85.50 | 11.63 | 24.40 |
| O | 12.92 | 12.36 | 9.54 | 8.81 | 31.70 | 50.00 |
| Fe | 23.08 | 6.11 | 0.57 | 0.29 | 56.67 | 25.60 |
| S | — | — | 20.44 | 5.40 | — | — |
| Totals | 100.00 | 100.00 | 100.00 | 100.00 | 100.00 | 100.00 |

Figure 3:
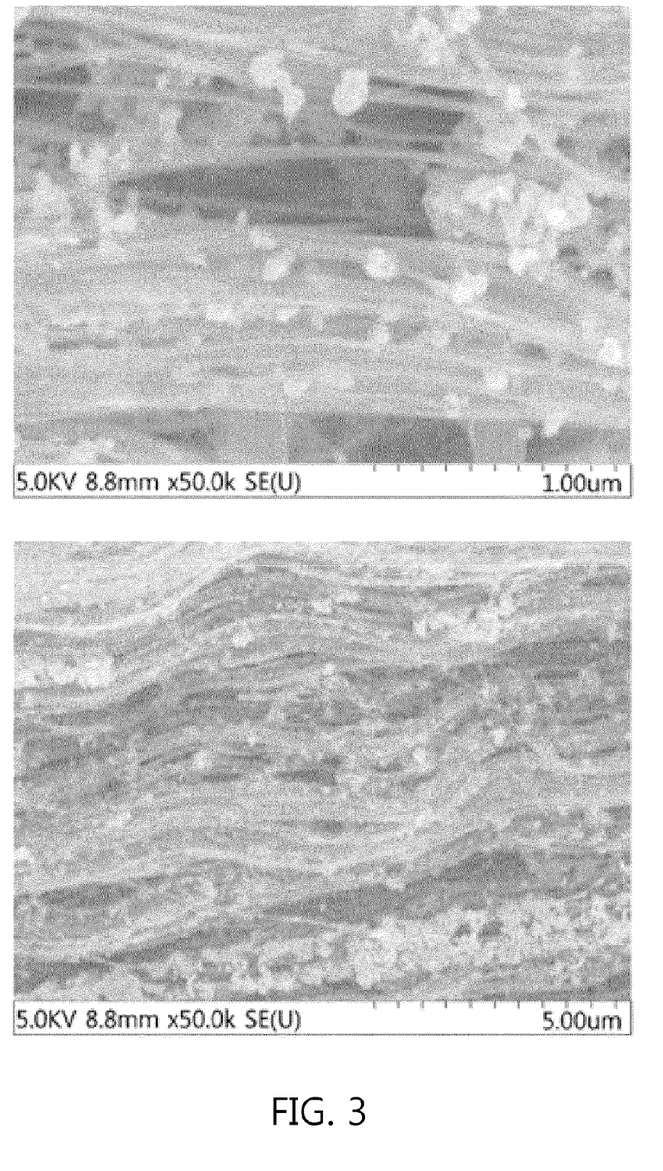
FIG. 3 shows SEM images of a carbon nanotube fiber of Example 1.
Figure 4:
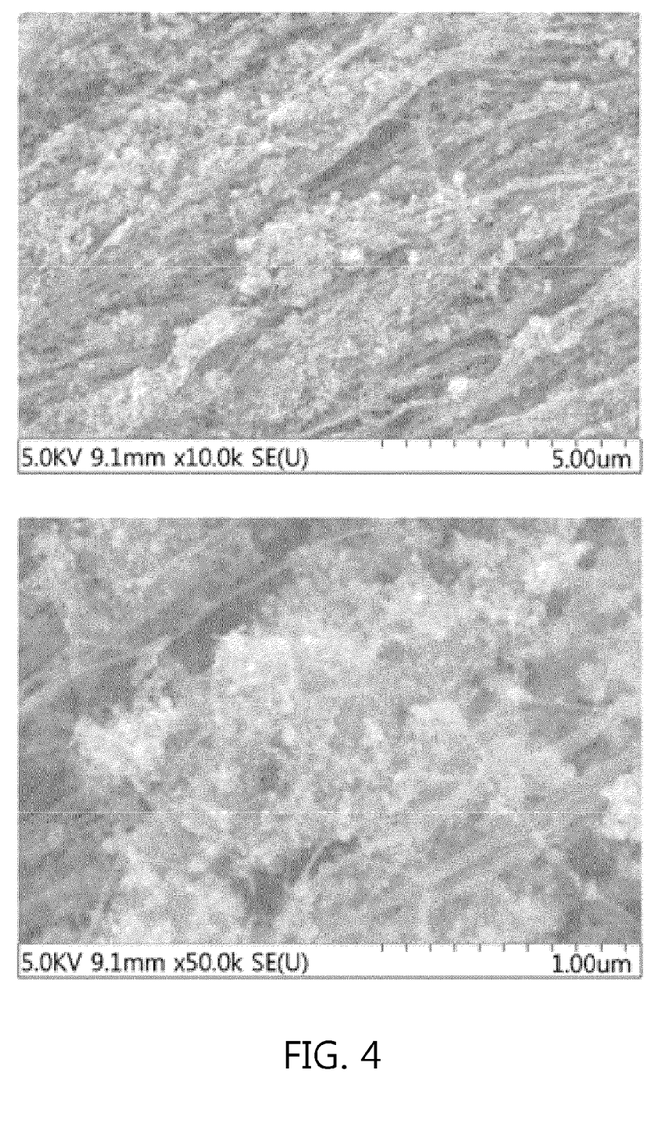
FIG. 4 shows SEM images of a carbon nanotube fiber of Comparative Example 1.
Figure 5:
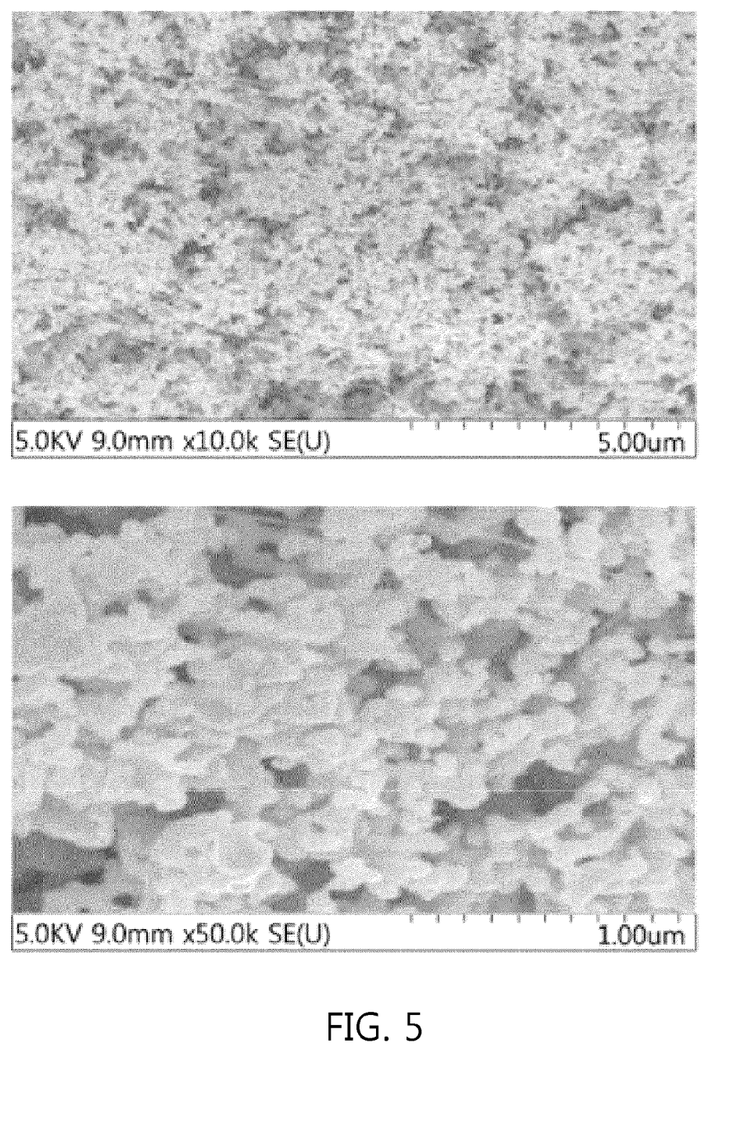
FIG. 5 shows SEM images of a carbon nanotube fiber of Comparative Example 2.

FIG. 3 shows the SEM images of Example 1, FIG. 4 shows the SEM images of Comparative Example 1, and FIG. 5 shows the SEM images of Comparative Example 2.

As is apparent from the drawings and Table 1, in Example 1, the temperature of the CNT fiber was maintained at 480° C., whereby amorphous carbon was removed and CNTs having high crystallinity were not removed but were left behind. Iron oxide, left behind as the impurities of the iron catalyst on the surface of CNTs, was observed. Thus, the final CNT fiber having no amorphous carbon was wound in Example 1.

In Comparative Example 1, non-oxidized sulfur (S), which is a component of the thiophene catalyst, was found to be left behind, based on the results of EDS. Also, amorphous carbon and iron oxide, corresponding to the impurities of the iron catalyst, were left behind on the surface of the CNT fiber. Since the amorphous carbon was not removed, the relative amount of carbon was large. Therefore, the iron oxide appears to remain in a small amount, but the amount of impurities can be concluded to be much larger.

In Comparative Example 2, the temperature of the CNT fiber was 700° C. or more, and thus not only amorphous carbon but also crystalline carbon, namely CNTs, were oxidized and removed. When observing the fiber remaining after the burning process, a red material, presumably iron oxide, was observed, which may be assumed to be iron oxide based on the SEM images and the results of EDS. Although some CNTs were observed, the CNTs were mostly oxidized.

DESCRIPTION OF REFERENCE NUMERALS

10: inlet 11: reactor body 12: reaction zone
13: heater 14: outlet 15a, 15b, 15c: guide
16: winder 17: voltage supplier 18: exhaust port
19: carbon nanotube fiber including impurities
20: Joule-heated carbon nanotube fiber
21: carbon nanotube fiber having no impurities

The invention claimed is:

1. An apparatus for manufacturing a carbon nanotube fiber, comprising:
   a cylindrical high-temperature reactor body having a reaction zone;
   an inlet for feeding a spinning material and a carrier gas into the reaction zone of the body;
   a heater for heating the reaction zone;
   an outlet provided at a bottom of the body so as to discharge a carbon nanotube fiber;
   a winder for collecting the discharged carbon nanotube fiber;
   a guide provided between the outlet and the winder; and
   a voltage supplier for applying a voltage to the guide,
   wherein the voltage is applied to the discharged carbon nanotube fiber to remove impurities from the carbon nanotube fiber.

2. The apparatus of claim 1, wherein the guide includes at least one selected from the group consisting of a copper electrode, a tungsten electrode, a stainless steel electrode, a gold electrode, and a silver electrode.

3. The apparatus of claim 1, further comprising a gas separator provided between the outlet and the winder.

4. The apparatus of claim 3, wherein the gas separator includes at least one selected from the group consisting of a water bath and a glove box.

5. The apparatus of claim 1, wherein two or more guides are provided.

6. The apparatus of claim 5, wherein at least two of the guides are connected to the voltage supplier.

7. The apparatus of claim 3, wherein when three or more guides are provided, at least one of the guides is included in the gas separator.

8. The apparatus of claim 1, wherein the voltage of the voltage supplier ranges from 1 to 20 V.

9. The apparatus of claim 1, wherein the impurities include amorphous carbon.

10. The apparatus of claim 1, wherein the inlet further includes a spinning material supply unit for supplying the spinning material and a carrier gas supply unit for supplying the carrier gas.

11. The apparatus of claim 1, wherein the winder includes at least one selected from the group consisting of a spindle, a reel, a bobbin, a drum, and a conveyor.

12. The apparatus of claim 1, wherein the inlet includes a spray nozzle for injecting the spinning material and a distribution plate for injecting the carrier gas.

13. The apparatus of claim 1, wherein the heater is a heating furnace surrounding the reactor body so that the reaction zone is heated to 1,000 to 3,000° C.

14. The apparatus of claim 1, wherein the spinning material is configured such that a catalyst precursor is dispersed in a liquid or gas carbon compound.

15. The apparatus of claim 14, wherein the liquid or gas carbon compound includes at least one selected from the group consisting of methane, ethylene, acetylene, methyl acetylene, vinyl acetylene, ethanol, methanol, propanol, acetone, xylene, chloroform, ethyl acetate, diethylether, polyethylene glycol, ethyl formate, mesitylene, tetrahydrofuran (THF), dimethylformamide (DMF), dichloromethane, hexane, benzene, carbon tetrachloride, and pentane.

16. The apparatus of claim 14, wherein the catalyst precursor includes at least one selected from the group consisting of metallocene including ferrocene, iron, nickel, cobalt, platinum, ruthenium, molybdenum, vanadium, and oxides thereof.

17. The apparatus of claim 14, wherein the spinning material further includes a catalyst activator.

18. The apparatus of claim 14, wherein the catalyst precursor is liquid in a liquid carbon compound, and is gas in a gas carbon compound.

19. The apparatus of claim 1, wherein the carrier gas is a hydrocarbon gas, an inert gas, a reducing gas, or a mixed gas thereof.

20. The apparatus of claim 17, wherein the catalyst activator is liquid in a liquid carbon compound, and is gas in a gas carbon compound.

* * * * *